(12) United States Patent
Tseng et al.

(10) Patent No.: US 9,379,609 B2
(45) Date of Patent: Jun. 28, 2016

(54) VOLTAGE ADJUSTMENT SYSTEM WITH VARIABLE RESISTANCE CONNECTED TO THE VOLTAGE FEEDBACK

(71) Applicant: HON HAI PRECISION INDUSTRY CO., LTD., New Taipei (TW)

(72) Inventors: Hsiang-Pin Tseng, New Taipei (TW); Min-Wei Lee, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 221 days.

(21) Appl. No.: 14/183,516

(22) Filed: Feb. 18, 2014

(65) Prior Publication Data

US 2014/0368177 A1 Dec. 18, 2014

(30) Foreign Application Priority Data

Jun. 13, 2013 (TW) .............................. 102120990 A

(51) Int. Cl.
*H02M 3/156* (2006.01)
*H02M 3/158* (2006.01)
*G05F 1/46* (2006.01)
*G05F 1/567* (2006.01)
*H02M 1/00* (2006.01)
*H02M 1/32* (2007.01)

(52) U.S. Cl.
CPC .............. *H02M 3/158* (2013.01); *H02M 3/156* (2013.01); *G05F 1/463* (2013.01); *G05F 1/567* (2013.01); *H02M 2001/0025* (2013.01); *H02M 2001/0032* (2013.01); *H02M 2001/327* (2013.01); *Y02B 70/16* (2013.01)

(58) Field of Classification Search
CPC ..................... H02M 2001/0025; H02M 3/156; H02M 3/158; H02M 3/1588; G05F 1/567; G05F 1/463; G05F 1/467; G05F 1/462
See application file for complete search history.

(56) References Cited

U.S. PATENT DOCUMENTS

| 8,730,695 | B1 * | 5/2014 | Ludlam | H02M 3/1584 363/65 |
| 2007/0080903 | A1 * | 4/2007 | Lee | G09G 3/2932 345/68 |
| 2012/0194258 | A1 * | 8/2012 | Nien | H02M 3/1588 327/512 |

* cited by examiner

*Primary Examiner* — Harry Behm
(74) *Attorney, Agent, or Firm* — ScienBiziP, P.C.

(57) ABSTRACT

A voltage adjustment system includes an adjust module, a control module, and a load module. The adjust module includes a voltage converting unit which includes a buck converter and an inductor. The control module includes a first resistor, a second resistor, and a variable resistance unit. The load module is electrically connected to the buck converter via the inductor. A connecting point between the inductor and the load module is grounded via the first resistor and the second resistor in series. A connecting point between the first resistor and the second resistor is grounded via the variable resistance unit. The variable resistance unit includes a thermal resistor located adjacent to the inductor. A resistance of the thermal resistor changes when a temperature of the inductor changes. An equivalent resistance of the variable resistance unit changes to adjust a voltage received by the load module.

14 Claims, 2 Drawing Sheets a
VOLTAGE ADJUSTMENT SYSTEM WITH VARIABLE RESISTANCE CONNECTED TO THE VOLTAGE FEEDBACK

FIELD

The present disclosure relates to a voltage adjustment system.

BACKGROUND

Personal computers usually have voltage adjustment systems to provide different working voltages to different components of the computer. The voltage adjustment system includes a control module, an adjustment module, and a load module. The adjustment module outputs a constant voltage to the load module via the control module. However, the adjustment module and the control module cannot adjust the voltage according to states of the load module. Thus, when the load module is over-loaded or under-loaded, the adjustment module still outputs the constant voltage, which wastes electric power.

Therefore, there is a need for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

In general, the word "module," as used herein, refers to logic embodied in hardware or firmware, or to a collection of software instructions, written in a programming language such as Java, C, or assembly. One or more software instructions in the modules may be embedded in firmware, such as in an erasable-programmable read-only memory (EPROM). The modules described herein may be implemented as either software and/or hardware modules and may be stored in any type of non-transitory computer-readable medium or other storage device. Some non-limiting examples of non-transitory computer-readable media are compact discs (CDs), digital versatile discs (DVDs), Blue-Ray discs, Flash memory, and hard disk drives.

Figure 1:
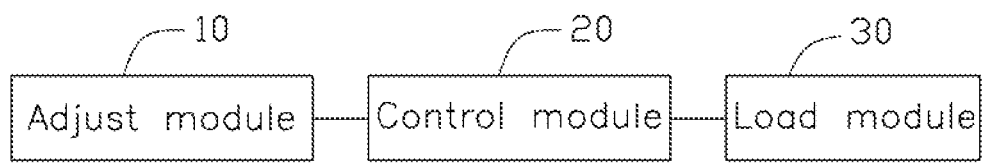
FIG. 1 is a block view of an embodiment of a voltage adjustment system.

FIG. 1 shows an embodiment of a voltage adjustment system. The voltage adjustment system includes an adjustment module 10, a control module 20, and a load module 30.

Figure 2:
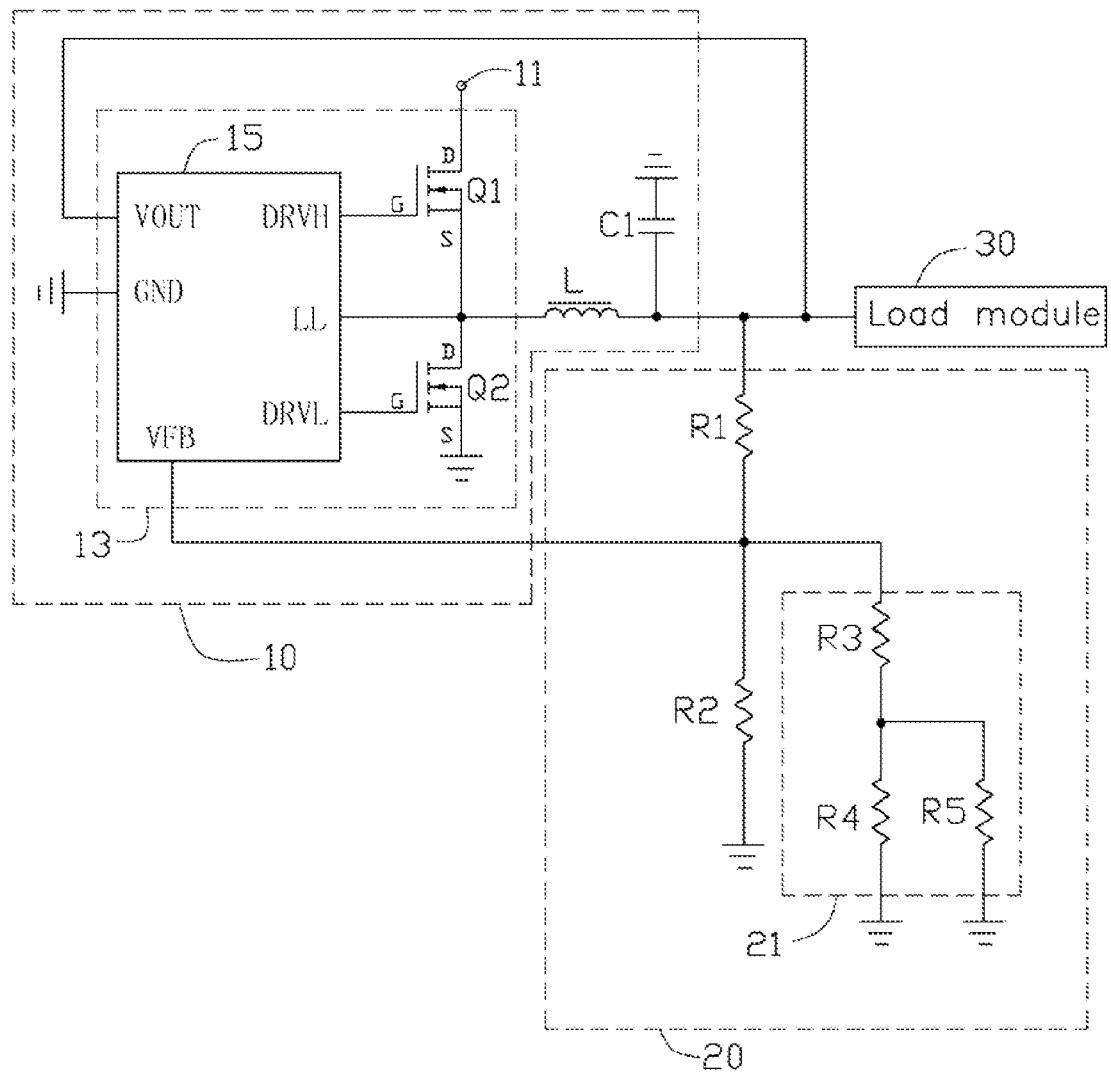
FIG. 2 is a circuit view of an embodiment of the voltage adjustment system of FIG. 1.

FIG. 2 shows that the adjustment module 10 includes a power source 11 and a voltage converting unit 13. The voltage converting unit 13 includes a buck converter 15, a first Metal-Oxide Semiconductor Field-Effect Transistor (MOSFET) Q1, a second MOSFET Q2, an inductor L, and a capacitor C1.

The buck converter 15 is a Direct Current (DC) to DC converter. The buck converter 15 includes an upper gate driver terminal DRVH, a current feedback terminal LL, a lower gate driver terminal DRVL, a voltage output terminal VOUT, a ground terminal GND, and a voltage feedback terminal VFB. Each of the first MOSFET Q1 and the second MOSFET Q2 includes a gate, a drain, and a source.

The upper gate driver terminal DRVH is electrically connected to the gate of the first MOSFET Q1. The lower gate driver terminal DRVL is electrically connected to the gate of the second MOSFET Q2. The current feedback terminal LL is electrically connected to a connecting point between the source of the first MOSFET Q1 and the drain of the second MOSFET Q2. The current feedback terminal LL is also electrically connected to the load module 30 via the inductor L.

A first connecting point between the inductor L and the load module 30 is grounded via the capacitor C1. The voltage output terminal VOUT is electrically connected to a second connecting point between the inductor L and the load module 30. The ground terminal GND is grounded. The drain of the first MOSFET Q1 is electrically connected to the power source 11. The source of the second MOSFET Q2 is grounded.

The control module 20 includes a first resistor R1, a second resistor R2, and a variable resistance unit 21. The variable resistance unit 21 includes a third resistor R3, a fourth resistor R4, and a fifth resistor R5. A third connecting point between the inductor L and the load module 30 is grounded via the first resistor R1 and the second resistor R2 in series. The voltage feedback terminal VFB is electrically connected to a connecting point between the first resistor R1 and the second resistor R2. The connecting point between the first resistor R1 and the second resistor R2 is grounded via the third resistor R3 and the fourth resistor R4 in series. A connecting point between the third resistor R3 and the fourth resistor R4 is grounded via the fifth resistor R5.

In one embodiment, the power source 11 provides a +12 volt (V) direct current (DC) voltage. The first MOSFET Q1 and the second MOSFET Q2 are N-channel enhancement mode field-effect transistors. A resistance of the first resistor R1 is substantially equal to a resistance of the second resistor R2. The fifth resistor R5 is a Negative Temperature Coefficient (NTC) thermal resistor. The fifth resistor R5 is located adjacent to the second MOSFET Q2 and the inductor L.

In use, the buck converter 15 of the adjustment module 10 converts the +12V DC voltage into a +1.5V DC voltage by the inductor L. A voltage fed back to the voltage feedback terminal VFB of the buck converter 15 is calculated according to the following formula:

$$\text{voltage fed back} = 1.5 \times \frac{r1}{r1 + r2} = 0.75 \text{ V},$$

wherein r1 and r2 are resistances of the first resistor R1 and the second resistor R2, respectively. A voltage received by the load module 30 is calculated according to the following formula:

$$\text{voltage received} = 0.75 \times \left(1 + \frac{r1}{r2} + \frac{r1}{req}\right),$$

wherein req is an equivalent resistance of the third resistor R3, the fourth resistor R4, and the fifth resistor R5.

When the load module 30 is under-loaded, temperatures of the second MOSFET Q2 and the inductor L decrease, which causes a resistance of the fifth resistor R5 to increase. Thus, the equivalent resistance req increases, and the voltage received by the load module 30 decreases. When the load module 30 is over-loaded, temperatures of the second MOSFET Q2 and the inductor L increase, which causes a resistance of the fifth resistor R5 to decrease. Thus, the equivalent resistance req decreases, and the voltage received by the load module 30 increases.

In one embodiment, resistances of the first resistor R1, the second resistor R2, the third resistor R3, and the fourth resistor R4 are about 10 kiloohms, about 10 kiloohms, about 30.1 kiloohms, and about 4.7 megaohms, respectively. When temperatures of both the second MOSFET Q2 and the inductor L are about 0 degrees Celsius, about 25 degrees Celsius, about 50 degrees Celsius, about 75 degrees Celsius, and about 100 degrees Celsius, resistances of the fifth resistor R5 are about 328.09 kiloohms, about 100 kiloohms, about 35.832 kiloohms, about 14.775 kiloohms, and about 6.8183 kiloohms, respectively, and the voltages received by the load module 30 are about 1.469 V, about 1.503 V, about 1.555 V, about 1.604 V, and about 1.637 V, respectively.

Even though numerous characteristics and advantages of the present disclosure have been set forth in the foregoing description, together with details of the structure and function of the disclosure, the disclosure is illustrative only, and changes may be made in detail, especially in the matters of shape, size, and the arrangement of parts within the principles of the disclosure to the full extent indicated by the broad general meaning of the terms in which the appended claims are expressed.

What is claimed is:

1. A voltage adjustment system, comprising:
   an adjust module comprising a voltage converting unit which comprises a buck converter and an inductor; the buck converter comprising a current feedback terminal and a voltage feedback terminal;
   a control module comprising a first resistor, a second resistor and a variable resistance unit; and
   a load module electrically connected to the current feedback terminal via the inductor; wherein a connecting point between the inductor and the load module is grounded via the first resistor and the second resistor in series; the voltage feedback terminal is electrically connected to a connecting point between the first resistor and the second resistor; the connecting point between the first resistor and the second resistor is grounded via the variable resistance unit; the variable resistance unit comprises a thermal resistor being located adjacent to the inductor; a resistance of the thermal resistor changes when a temperature of the inductor changes; and an equivalent resistance of the variable resistance unit changes to adjust a voltage received by the load module;
   wherein the variable resistance unit comprises a third resistor, a fourth resistor and a fifth resistor; the connecting point between the first resistor and the second resistor is grounded via the third resistor and the fourth resistor serially; and a connecting point between the third resistor and the fourth resistor is grounded via the fifth resistor.

2. The voltage adjustment system of claim 1, wherein the voltage converting unit further comprises a first Metal-Oxide-Semiconductor Field-Effect Transistor (MOSFET) and a second MOSFET; each of the first MOSFET and the second MOSFET comprises a gate, a drain and a source; the buck converter further comprises an upper gate driver terminal and a lower gate driver terminal; the upper gate driver terminal is electrically connected to the gate of the first MOSFET; the lower gate driver terminal is electrically connected to the gate of the second MOSFET; the current feedback terminal is electrically connected to a connecting point between the source of the first MOSFET and the drain of the second MOSFET; the drain of the first MOSFET is electrically connected to a power source; and a source of the second MOSFET is grounded.

3. The voltage adjustment system of claim 2, wherein the first MOSFET and the second MOSFET are N-channel enhancement mode field-effect transistors.

4. The voltage adjustment system of claim 2, wherein the power source provides a +12V DC voltage.

5. The voltage adjustment system of claim 1, wherein the thermal resistor is a Negative Temperature Coefficient (NTC) thermal resistor.

6. The voltage adjustment system of claim 5, wherein when a temperature of the inductor decreases, the resistance of the thermal resistor increases, the equivalent resistance of the variable resistance unit increases, the voltage received by the load module decreases to save electric power; and when the temperature of the inductor increases, the resistance of the thermal resistor decreases, the equivalent resistance of the thermal resistor decreases, the voltage received by the load module increases to make sure the load module works normally.

7. The voltage adjustment system of claim 1, wherein a resistance of the first resistor is substantially equal to a resistance of the second resistor.

8. A voltage adjustment system, comprising:
   an adjust module comprising a voltage converting unit which comprises a buck converter and an inductor;
   a control module comprising a first resistor, a second resistor and a variable resistance unit; and
   a load module electrically connected to the buck converter via the inductor; wherein a connecting point between the inductor and the load module is grounded via the first resistor and the second resistor in series; a connecting point between the first resistor and the second resistor is grounded via the variable resistance unit; the variable resistance unit comprises a thermal resistor being located adjacent to the inductor; a resistance of the thermal resistor changes when a temperature of the inductor changes; and an equivalent resistance of the variable resistance unit changes to adjust a voltage received by the load module;
   wherein the variable resistance unit comprises a third resistor, a fourth resistor and a fifth resistor; the connecting point between the first resistor and the second resistor is grounded via the third resistor and the fourth resistor serially; and a connecting point between the third resistor and the fourth resistor is grounded via the fifth resistor.

9. The voltage adjustment system of claim 8, wherein the voltage converting unit further comprises a first Metal-Oxide-Semiconductor Field-Effect Transistor (MOSFET) and a second MOSFET; each of the first MOSFET and the second MOSFET comprises a gate, a drain and a source; the buck converter comprises an upper gate driver terminal, a current feedback terminal, a lower gate driver terminal and a voltage feedback terminal; the upper gate driver terminal is electrically connected to the gate of the first MOSFET; the lower gate driver terminal is electrically connected to the gate of the second MOSFET; the current feedback terminal is electrically connected to a connecting point between the source of the first MOSFET and the drain of the second MOSFET; the drain of the first MOSFET is electrically connected to a power source; and a source of the second MOSFET is grounded.

10. The voltage adjustment system of claim 9, wherein the load module is electrically connected to the current feedback terminal via the inductor; and the voltage feedback terminal is electrically connected to the connecting point between the first resistor and the second resistor.

11. The voltage adjustment system of claim 9, wherein the first MOSFET and the second MOSFET are N-channel enhancement mode field-effect transistors.

12. The voltage adjustment system of claim 8, wherein the thermal resistor is a Negative Temperature Coefficient (NTC) thermal resistor.

13. The voltage adjustment system of claim 12, wherein when a temperature of the inductor decreases, the resistance of the thermal resistor increases, the equivalent resistance of the variable resistance unit increases, the voltage received by the load module decreases to save electric power; and when the temperature of the inductor increases, the resistance of the thermal resistor decreases, the equivalent resistance of the thermal resistor decreases, the voltage received by the load module increases to make sure the load module works normally.

14. The voltage adjustment system of claim 8, wherein a resistance of the first resistor is substantially equal to a resistance of the second resistor.

* * * * *